US009308533B2

(12) United States Patent
Gross

(10) Patent No.: US 9,308,533 B2
(45) Date of Patent: Apr. 12, 2016

(54) SHREDDER WITH SIDE DISCHARGE

(71) Applicant: Thomas Raymond Gross, Mt. Pleasant, MI (US)

(72) Inventor: Thomas Raymond Gross, Mt. Pleasant, MI (US)

(*) Notice: Subject to any disclaimer, the term of this patent is extended or adjusted under 35 U.S.C. 154(b) by 360 days.

(21) Appl. No.: 13/915,435

(22) Filed: Jun. 11, 2013

(65) Prior Publication Data

US 2013/0327866 A1 Dec. 12, 2013

Related U.S. Application Data

(60) Provisional application No. 61/658,431, filed on Jun. 12, 2012.

(51) Int. Cl.
*B02C 18/22* (2006.01)
*A01G 3/00* (2006.01)

(52) U.S. Cl.
CPC ............ *B02C 18/2216* (2013.01); *A01G 3/002* (2013.01); *B02C 2201/066* (2013.01)

(58) Field of Classification Search
CPC .. B02C 18/22; B02C 18/2216; B02C 18/145; B02C 2018/162; A01G 3/002
USPC .............................. 241/55, 223, 224, 277, 280
See application file for complete search history.

(56) References Cited

U.S. PATENT DOCUMENTS

| | | | |
|---|---|---|---|
| 3,875,984 A | 4/1975 | Plough | |
| 3,905,558 A * | 9/1975 | Gaitten | 241/55 |
| 3,944,147 A | 3/1976 | Pletcher | |
| 4,009,837 A | 3/1977 | Schnyder | |
| 4,135,563 A | 1/1979 | Maucher | |
| 4,162,769 A | 7/1979 | Lapointe | |
| 4,260,114 A | 4/1981 | Herder | |
| 4,958,775 A | 9/1990 | Arasmith | |
| 5,005,620 A | 4/1991 | Morey | |
| 5,209,278 A | 5/1993 | Carpenter et al. | |
| 5,390,862 A | 2/1995 | Eglin | |
| 5,692,548 A | 12/1997 | Bouwers et al. | |
| 6,032,707 A * | 3/2000 | Morey et al. | 144/174 |
| 6,036,125 A | 3/2000 | Morey et al. | |
| 6,824,089 B2 | 11/2004 | Gross et al. | |
| 7,513,449 B2 | 4/2009 | Gross et al. | |
| 7,552,884 B2 * | 6/2009 | Gross et al. | 241/261.1 |
| 7,909,275 B2 | 3/2011 | Gross et al. | |
| 8,118,245 B2 | 2/2012 | Gross et al. | |
| 8,215,346 B2 | 7/2012 | Gross et al. | |
| 8,317,117 B2 * | 11/2012 | Galloway et al. | 241/55 |
| 9,073,058 B2 * | 7/2015 | Voelker et al. | |
| 2002/0195509 A1 * | 12/2002 | Lepage | A01D 87/122 241/186.3 |
| 2004/0108398 A1 | 6/2004 | Lepage | |

* cited by examiner

*Primary Examiner* — Mark Rosenbaum

(74) *Attorney, Agent, or Firm* — Dean B. Watson

(57) ABSTRACT

A machine for reducing material that includes a cylindrical cutting drum and a side discharge assembly. In one aspect there is disclosed a machine for reducing material that includes a cutting drum and a housing surrounding the cutting drum establishing a volume between itself and the cutting drum for reduced material to be carried where the volume increases along the length of the cutting drum until the volume opens into a side discharge assembly disposed at the end region of the cutting drum.

18 Claims, 3 Drawing Sheets

SHREDDER WITH SIDE DISCHARGE

CROSS-REFERENCE TO RELATED APPLICATIONS

The present invention relates to, and is entitled to the benefit of the earlier filing date and priority of: U.S. Provisional Patent Application No. 61/658,431 filed Jun. 12, 2012, entitled, "SHREDDER WITH A SIDE DISCHARGE, naming the same inventor as named herein, Thomas R. Gross, the disclosure of which is hereby incorporated herein by reference.

BACKGROUND OF THE INVENTION

I. Field of the Invention

The present invention relates to machines for reducing materials, including materials made of wood or other fibrous materials, and more particularly to drum chippers.

II. Description of the Background

Drum chippers and shredders for reducing wood are generally known, see for example U.S. Pat. No. 8,118,245 entitled Self-contained Shredder Assembly for Reducing and Sizing Material; U.S. Pat. No. 7,909,275 entitled Self-contained Shredder Assembly for Reducing and Sizing Material; U.S. Pat. No. 7,552,884 entitled Drum Shredder with Flywheel or Discharge Assembly; U.S. Pat. No. 7,513,449 entitled Wood Collection and Reducing Machine; and U.S. Pat. No. 6,824,089 entitled Wood Collection and Reducing Machine, the disclosures of which are hereby incorporated herein by reference in their entirety.

However, what is needed is a new machine design for reducing material that can utilize a more conventional style cutting drum and has excellent material discharge efficiency.

SUMMARY OF THE INVENTION

The present invention comprises a machine for reducing material that includes a rotatable cutting drum and one or more novel features as provided below. In a preferred embodiment there is disclosed a machine for reducing material which includes a cylindrical cutting drum with a side discharge assembly. In another preferred embodiment, there is disclosed a machine for reducing material which includes a cylindrical cutting drum and a conical housing and/or belly-pan. In still another preferred embodiment there is disclosed a machine for reducing material which includes a cutting drum having an end region and surrounded radially by a closed-loop housing; a drive system connected to the cutting drum; and a side discharge assembly disposed at the end region of the cutting drum; the closed-loop establishing a volume for reduced material to be carried, the volume increasing along the length of the cutting drum until the volume opens into the side discharge assembly disposed at the end region of the cutting drum. In still another preferred embodiment there is disclosed a machine for reducing material which includes a cutting drum having an end region and surrounded radially by a closed-loop housing; a drive system connected to the cutting drum; a side discharge assembly disposed at the end region of the cutting drum; and a belly-pan at least partially surrounding the cutting drum, the belly-pan establishing a volume between itself and the cutting drum for reduced material to be carried, the volume increasing along the length of the cutting drum until the volume opens into the side discharge assembly disposed at the end region of the cutting drum. In still other embodiments the cylindrical cutting drum has a face, wherein the in-feed is angled relative to the face between 20 and 40 degrees inclusive.

For a more complete understanding of the claimed invention(s), reference is now made to the accompanying drawings and detailed description of preferred embodiments. Throughout the several figures and views, like symbols refer to like elements.

DETAILED DESCRIPTION OF THE PREFERRED EMBODIMENTS

Figure 1:
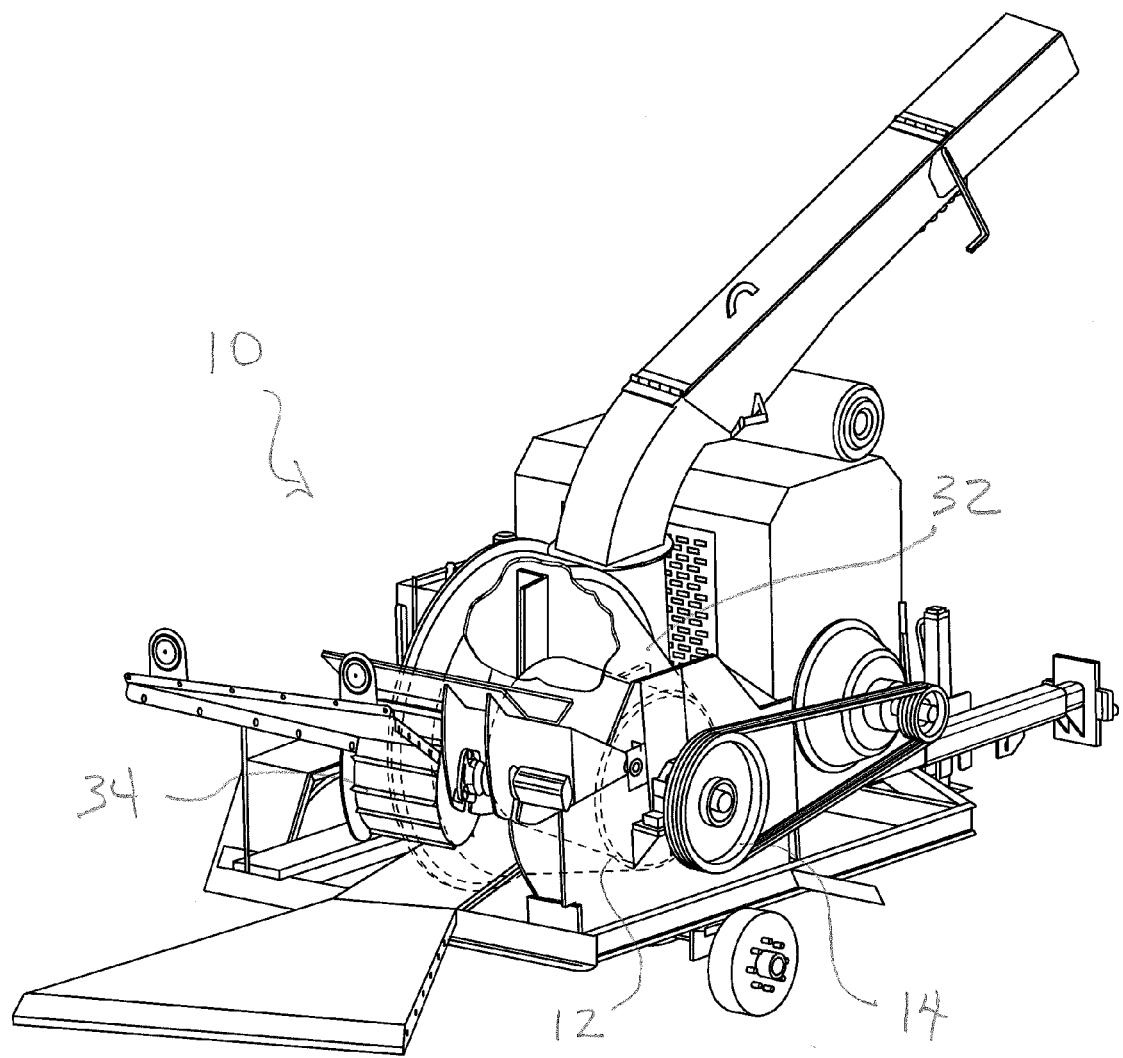
FIG. 1-4 are perspective views in part showing embodiments of machines for reducing material having a cylindrical cutting drum and a side discharge assembly.
Figure 2:
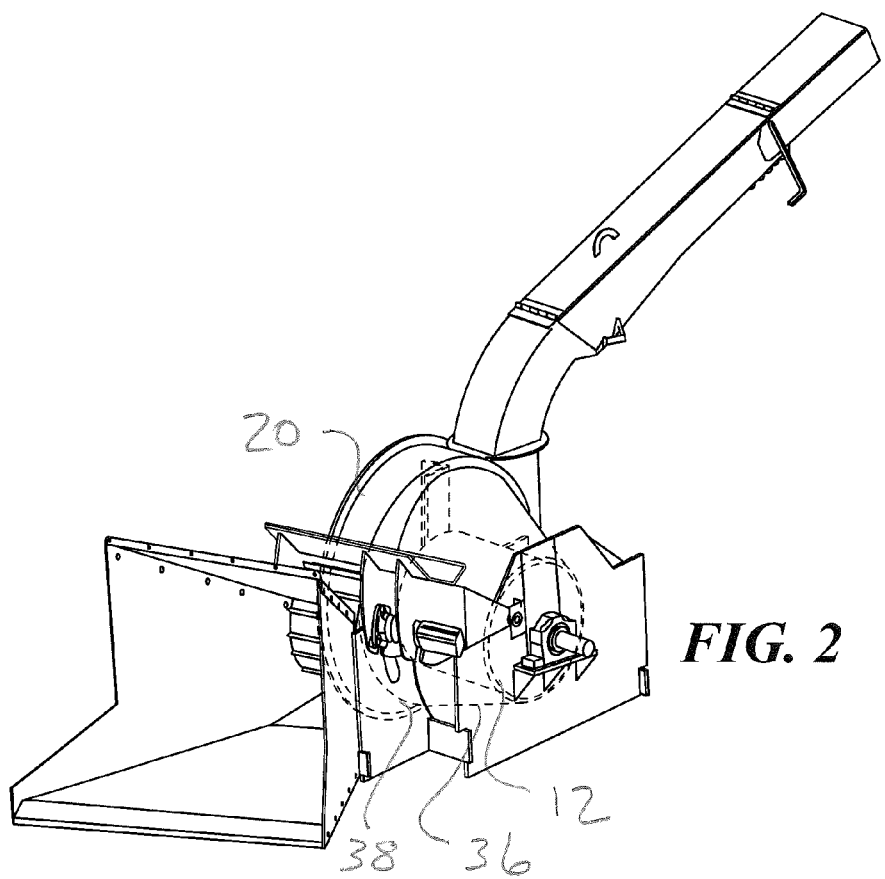
Figure 4:
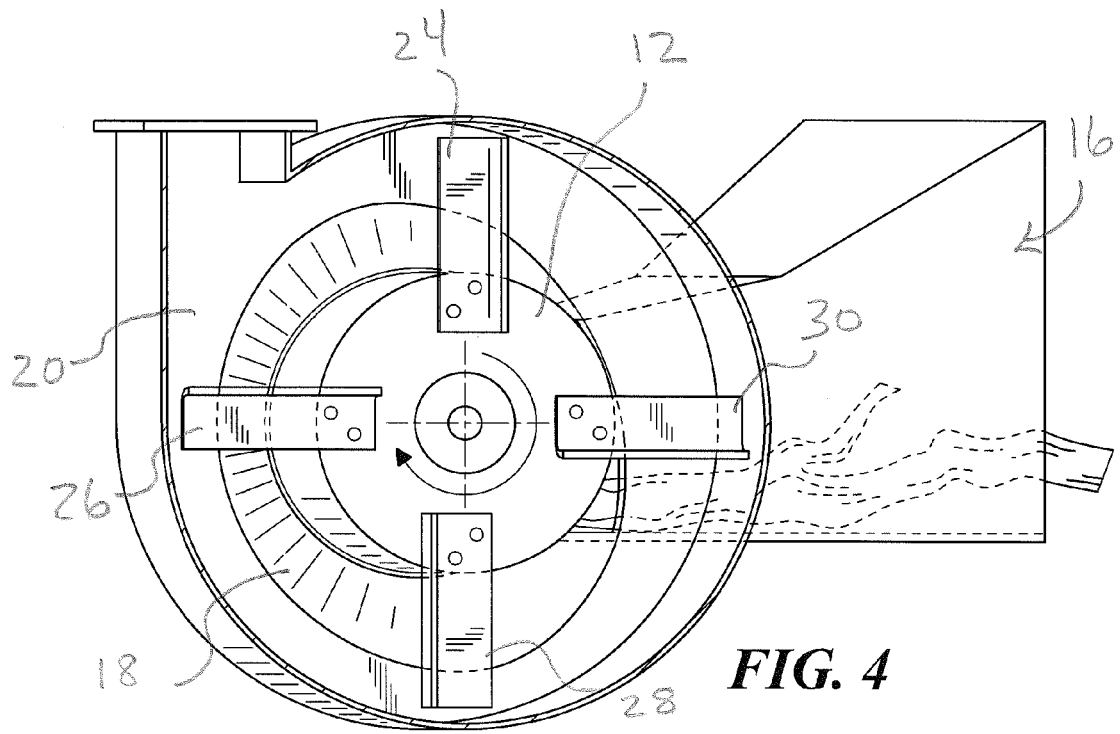
Figure 3:
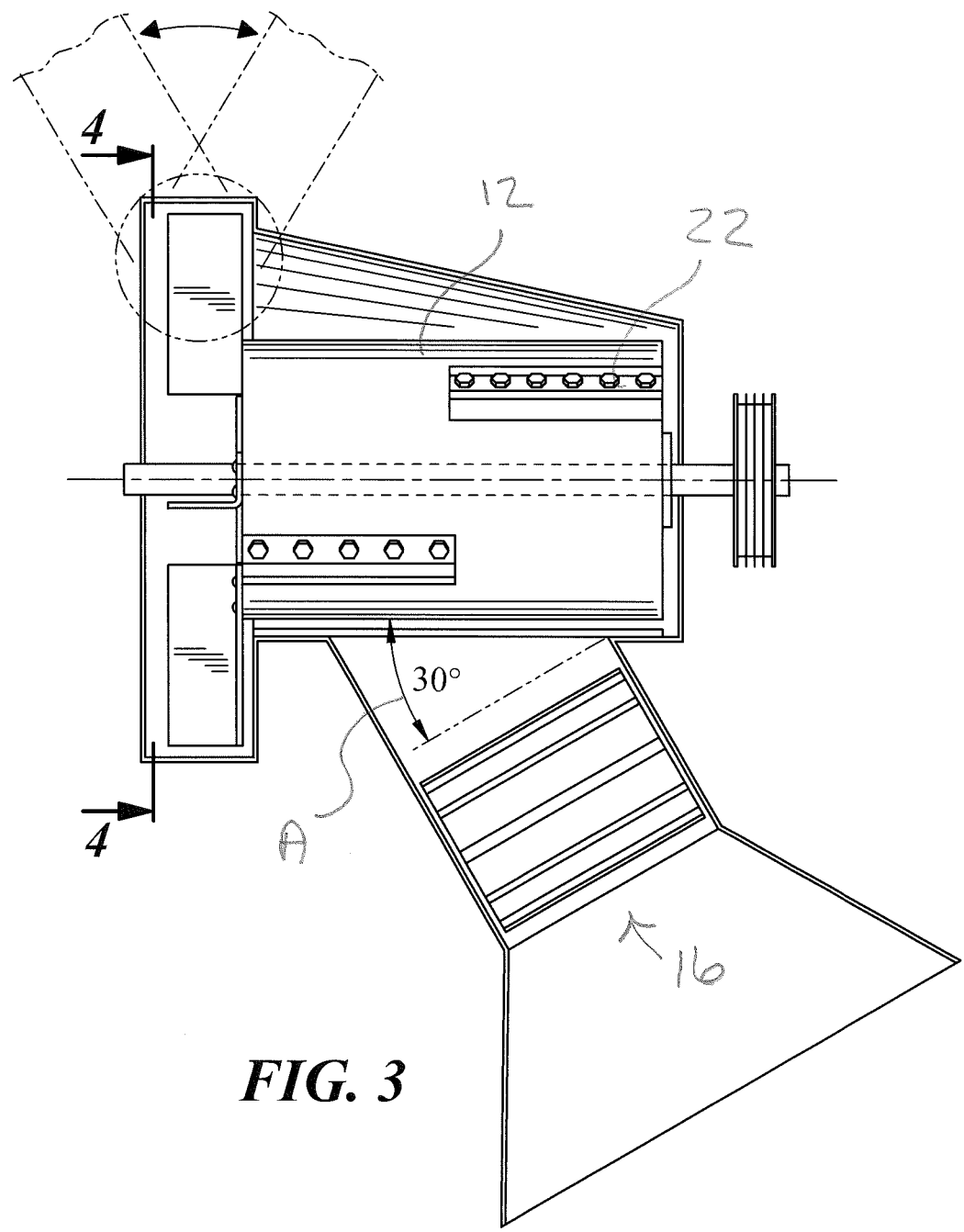

Disclosed herein are embodiments of a shredder for reducing material that have one or more novel features as presented in the embodiments below which may be combined in total or individually.

To affect material reduction, the shredder includes a cutting drum. The cutting drum is preferably cylindrical. A cylindrical cutting drum is one that has a cross-section with an outer diameter that is essentially uniform along its length. As shown, the cutting drum has an essentially circular cross-section that is essentially uniform along its length.

The cutting drum is preferably adapted to radially carry chips on the outside of the drum, and as such, may be essentially imperforate, impervious or impenetrable to reduced material so that chips may not pass radially inwardly through the outer wall or skin of the drum. A cutting drum adapted to radially carry chips on the outside of the drum may be adapted for carrying chips radially in any suitable manner, such as having a drum with a solid surface or imperforate skin, with small holes which are impenetrable by the reduced material, with a continuous outer surface that includes extended blades with a channel disposed beneath the blades, and/or by providing at least one channel in the surface of the drum for carrying chips. Preferably the cutting drum has a substantially uniform, smooth outer surface, other than the cutting implements, associated hardware, and channels.

The cutting drum may be hollow, essentially solid, or solid. However, it is noted that any channels in the surface of the drum are essentially imperforate to reduced material so that the surface of the drum still precludes reduced material from passing radially inwardly into the drum. A hollow cutting drum allows for making a larger cutting head with reduced weight, which can reduce material costs and provide ease of handling. A hollow center may also be used for fixing a drive shaft therein. A solid or essentially solid cutting drum provides a heavy member with increased stability and may also provide increased momentum so that chipping large branches does not hamper the speed of the drum or the cutting blade(s) during operation.

The cutting drum may be made of any suitable material, such as cast alloy, forged steel, cast iron, steel plate, other hard materials, etc. Preferably the drum has a skin or outer surface made of steel plate, the steel plate formed and welded on the inside to arrange the plates.

The cutting drum may be angled in relation to the in-feed. By angling the cutting drum, the cutting drum blade, chip efficiency, and quality can be increased. The drum face may angle towards the discharge assembly. The cutting drum face may be angled in relation to the in-feed 20 degrees or more, and may angle between 20 and 40 degrees relative to the in-feed. In practice, wood or other material can be fed to a rotating drum where one or more cutting implements impact on the material at an angle to the grain, for example, as in the case of logs.

The cutting drum preferably has at least one cutting implement. The cutting implement may be any suitable reducing device. The reducing device is preferably selected based on the particular material reduction operation being performed. Suitable cutting implements include: blades, spikes, fixed or swinging hammers, etc. In one embodiment, the cutting implements are blades disposed about the outer surface of the drum. A cutting blade is an elongated knife(s) or chisel(s) that extend(s) longitudinally along some portion of the cutting axis of the cutting drum. Blades are particularly good cutting implements for reducing wood. Each blade may be connected to the cutting drum at an acute angle relative to the surface thereof to enhance chipping and material draw into the shredder.

In another embodiment, the cutting drum has a plurality of cutting implements wherein each cutting implement extends less than the entire length of the cutting drum. In a preferred embodiment each cutting implement extends 50% or less of the length of the cutting drum. Cutting implements that extend less than the length of the cutting drum may be used to reduce material draw and drum stalling. Cutting implements that extend less than the entire length of the cutting drum are preferably staggered over the surface of the drum. Staggered cutting implements can be used to control the feed rate of material into the blades during operation. Staggered cutting implements may be distributed about the surface of the drum to give at least one full cut per drum rotation. Staggered cutting implements may also be distributed over the surface of the cutting head to increase the amount of cuts along any one section of the drum.

The cutting blade may be straight or curved with a straight or curve edge. Each cutting blade may have multiple edges so that the blade may be repositioned to provide a fresh, sharpened edge. The cutting implement may be removably attached to the drum. The cutting implement may be removably fixed to the drum with a blade keeper. The blade keeper is a block or bearing that may be tapped to receive one or more bolts or other fasteners to hold the blades to the drum. Each cutting blade may be formed by combining multiple, smaller blade sections together, such as by providing a number of smaller blades adjacent to one another. Multiple blade sections can provide a single edge with sections that can be replaced independently of other sections. The sections of the single edge may be of different lengths.

The cutting drum preferably has at least one channel. Each channel may be associated with one or more cutting implements. Each channel may be disposed adjacent to one cutting implement so that the channel can receive reduced material from said cutting implement and may precede the cutting implement as measured by the direction of drum rotation. As shown, the channels are elongated, radially outwardly opening depressions or cups that have a set of walls and a floor which form a channel basin. The at least one channel may open at one end of the channel. In certain embodiments the at least one channel may open at the end of the drum. In other embodiments it was found that the at least one channel does not have to open at either end, and may be at least partially blocked (as shown). Each channel may present a concave radially outwardly facing cross sectional configuration so as to trap reduced material on the outer surface of the drum and preclude the passage of reduced material radially inwardly into the drum into the interior of the drum. Each channel preferably has a floor or basin that is imperforate to reduced material. In a preferred embodiment each channel is disposed prior to the associated cutting implement (as measured in relation to the cutting blade and direction of drum rotation). In one embodiment the at least one channel extends the length of a cutting region, drum section or the entire cutting drum. In another embodiment the channel only extends the length of the associated cutting implement. The channel may be blocked by any suitable blocking device or block, such as a wall, butt plate, blank, etc. As shown the channels are blocked at both ends. The blocking device or block maybe a butt plate supported by the drum. The at least one channel may open at one end to at least temporarily communicate with a material accelerator chamber.

The shredder may have at least one paddle and may have a plurality of paddles. The paddles may be joined with the cutting drum. The paddle(s) may be formed of any suitable material, such as an alloy, composite, plastic, etc. The shredder may have three or more paddles, four or more, five or more, or six or more paddles disposed at an end of the drum to aid in reduced material discharge. The paddle(s) may aid in reduced material discharge by providing airflow through the discharge assembly and may also act to directly move and throw material that comes into contact with the paddles. The paddles may be evenly spaced about the outer side(s) of the cutting drum, drive shaft. The paddles preferably act to generate air currents when the drum rotates. Preferred arrangements include paddles positioned at 12, 3, 6 and 9 o'clock of the drum. Extra paddles may also be added at 1 and 7 o'clock, etc. Extra paddles may be added in a manner that increases discharge efficiency while keeping rotational balance of the device they are mounted, such as the drum. The paddles are preferably formed, sized and angled for the type of material that the paddles are to move. The paddle(s) are preferably positioned in the material accelerator chamber. The paddles may be rigid or thick enough to handle both contacting and pushing reduced material and large enough to generate substantial air flow through the shredder to draw reduced material into the chamber and out of the shredder. The paddles may extend past the outer most circumference of the drum or drum skin.

The shredder preferably has a side discharge assembly. A discharge assembly is any device suitable for receiving reduced material from the drum and altering the direction of the reduced material in some manner. The discharge assembly preferably includes a material accelerator chamber. The material accelerator chamber is a chamber that accepts reduced material from the cutting drum and increases or maintains the speed of reduced material. The material accelerator chamber may be disposed adjacent to the cutting drum and in material transfer communication with a belly-pan. The material accelerator chamber may include a housing at a side of the cutting drum that is open to the drum for receiving reduced material. The material accelerator chamber may open to a transition or directly through a discharge port. The material accelerator chamber may have a rounded, smooth inner surface. The rounded inner surface of the material accelerator chamber may have a circumference or diameter that is greater than the cutting drum at the cutting drums widest diameter. The inner surface preferably breaks at a discharge opening. The inner surface of the material accelerator chamber may be sized to accommodate the paddles and their rotation within a tight tolerance. The material accelerator chamber may be open on the side facing the drum all the way around the cutting drum.

The discharge assembly may further include a transition in communication with the material accelerator chamber. A transition is a structure or housing that allows chips or reduced material to be guided away and/or upward or downward from the cutting drum to be eventually discharged from the shredder. The transition preferably tapers along some length and is in communication with a discharge port. The transition may also be connected to an extension chute that may allow further control of the discharge stream. The transition may include a series of walls, such as sidewalls, a front wall and a rear wall. The sidewalls and/or front and/or rear walls of the transition may be slanted inward. Proper slanting of the transition allows for effective narrowing of the discharge stream without excessive loss in material momentum.

The shredder may include a belly-pan. A belly-pan provides a device for trapping reduced material in the channel(s) or on the surface of the cutting drum and generally allows material to be carried radially with the cutting drum during operation over some travel distance of the cutting drum. The belly-pan may conform to the shape of the cutting drum at one side and expands in volume along the length of the cutting drum until the belly-pan opens to the acceleration chamber. The belly-pan may wrap the cutting drum beginning at about the anvil and extend around the drum in the direction of drum rotation. The belly-pan in cooperation with other components may form part of a closed loop around the drum. The belly-pan may wrap almost all the way around the drum or may only wrap as much as is necessary to keep material in the channels long enough so that at least the majority of material is discharged to the side of the drum as the belly-pan expands in volume to one end.

In a preferred embodiment, where the cutting drum is cylindrical, the closed-loop is conical with a wider volumetric region and a smaller volumetric region and formed in a shape that expands along the length of the cutting drum. The space between the housing and the cutting drum may increase substantially uniformly along the length and width of the cutting drum. A small clearance at one side with an expanding volumetric capacity towards the other side of the cutting drum allows material or chips to be carried to the side of the drum so that they may flow into a side discharge assembly.

The belly-pan may be coupled with a hood or housing that may complete an enclosed loop, or a housing may form a closed loop alone. The hood may form part of a housing that the cutting drum is supported on. An access panel may be provided in the hood so that the cutting drum can be accessed through the housing.

The shredder may include an anvil. An anvil is any hard object that provides an edge that cooperates with the one or more cutting implements to help reduce material. The anvil may be a single piece or may be made up of a plurality of pieces. The anvil may be connected to the housing or form part of the in-feed. The anvil may be disposed adjacent to the cutting drum, extend along the cutting axis, and may be separated from the drum by a gap sufficient to allow drum rotation. The anvil may be a plate which is removably mounted to the housing or other support structure. The anvil(s) may be translatable or movable. A translatable anvil allows the distance between the anvil and cutting drum or cutting implements to be adjusted, which may be used to regulate the size of reduced material or create a more consistent end product.

The shredder preferably includes a housing. The housing may support the cutting drum. The housing may include a frame, supports, panels, hood, cap, bearings, belly-pan, chamber, etc. The housing may form a closed loop around the drum which opens at one side.

The shredder preferably includes a drive connected to the cutting drum. A drive is any device that provides rotation and power to the drum. The drive may include a drive shaft and a power source. The drive shaft may be connected to the power source by any suitable drive means, such as a belt drive, chain drive, electric drive, hydraulic drive, etc. Suitable power sources include electric motors, hydraulic systems, diesel engines, gas engines, etc. The cutting drum may also be supported by a stub shaft. The stub shaft may be disposed at an end opposite the drive shaft to aid in further support of the cutting drum. The stub shaft in turn may be supported by any suitable means, such as by the housing, a frame, associated brackets, etc. The drive shaft may include a key or cutout to lock the drive shaft to a connector.

The invention may be better understood with reference to the following preferred embodiments.

FIGS. 1-4 depict a preferred embodiment(s) of a shredder 10 having a cutting drum 12 and a discharge assembly with various components removed or added in phantom to aid in viewing and understanding. As configured there for purposes of illustration, the shredder 10 is particularly suitable for chipping wood and other fibrous materials. The shredder 10 has an in-feed 16 where wood or other materials may be fed, reduced by the cutting drum 12, and expelled with the discharge assembly. The shredder may also have an anvil where the in-feed meets the cutting drum. The cutting drum has a face that is angled 'A' in relation to the in-feed 16. The angle may be from 20 to 40 degrees, 28 to 34 degrees or 30 to 32 inclusive. An angle A of 31 degrees should work well for wood and possible other cutting applications.

The cutting drum 12 is supported by a support, such as a drive shaft. The cutting drum 12 is cylindrical with at least one cutting implement 22 and at least one channel. The cutting implement as shown is a cutting blade. The cutting blade is removably mounted on a keeper along the length of the cutting drum. The channel as shown is open to the surface of the drum, is open on one end, is blocked at another end, and has a basin that is imperforate to reduced material. A belly-pan 18 partially wraps the cutting drum 12 at a bottom portion thereof and expands in distance from the cutting drum along the length of the cutting Drum 12. As shown in phantom-lined the belly-pan in combination with the hood 32 is conical (meaning having conical internal features).

The cutting drum 12 has a plurality of paddles (four in this embodiment) 24, 26, 28, 30 attached to the drum which rotate in unison. The paddles reside in the discharge assembly and can extend past the outer most circumference of the drum.

The discharge assembly as shown includes an accelerator chamber 20, a transition, a discharge chute, and a discharge port all in material transfer communication with each other. More specifically, the paddles 24, 26, 28, 30 reside in the accelerator chamber 20. The paddles operate in a rotory fashion to move material from the accelerator chamber through the transition out the discharge port. The discharge assembly in turn is open to the side of the cutting drum 12 to receive reduced material from the belly-pan 18 in cooperation with the channel(s) of the cutting drum 12. In this embodiment, the material accelerator chamber 20 has a smooth, rounded, inner surface that is in close tolerance with the outer edges of the paddles. The rounded surface may flatten out at some portion prior to discharge. The inner surface has an opening that leads to the transition. The transition is tapered to reduce the inner volume. The transition leads to an adjustable discharge chute for directing the discharge of material out and away from the cutting drum 12.

The cutting drum and discharge assembly maybe supported on a trailer having a frame, an axle tied to the frame, wheels supported by the axle and a hitch attached to the frame as generally depicted in FIG. 1. The shredder 10 may also include a feed limiter roller 34 mounted adjacent the in-feed 16.

As may be appreciated from the disclosure contained herein the cutting drum, paddles, drive, housing, and/or side discharge assembly may be provided as modular components that can be attached to any number of shredder systems having different trailer packages, drives, etc. A modular system can be used for aftermarket retrofitting of a shredder in accordance with one or more embodiments of the claimed invention.

While the invention has been illustrated in the foregoing description, the same is to be considered as illustrative and not restrictive in character. For example the shredder of the present invention may be adapted for shredding various agricultural products with only slight or no modifications to the invention hereof. Therefore, it should be understood that only the preferred embodiments have been shown and described fully and that all changes and modifications that come within the spirit and scope of the claimed invention are desired to be protected.

The invention claimed is:

1. A machine for reducing material comprising: an in-feed, a cylindrical cutting drum having an essentially uniform cross-section in material flow communication with the in-feed, a side discharge assembly in material flow communication with the cylindrical cutting drum and a housing, the housing forming a closed loop around the cylindrical drum in a conical shape that opens at one end into the side discharge assembly.

2. The machine for reducing material of claim 1 wherein the conical shape has a wider volumetric region and a smaller volumetric region that expands along the length of the cutting drum towards the side discharge assembly.

3. The machine for reducing material of claim 1, wherein the cylindrical cutting drum is angled between 20 and 40 degrees relative to the in-feed.

4. The machine for reducing material of claim 1 which further includes a belly pan as part of the housing forming a closed loop around the cylindrical drum.

5. The machine for reducing material of claim 1 further comprising at least one paddle connected to the cylindrical cutting drum and disposed within the side discharge assembly.

6. The machine for reducing material of claim 1 further including a housing forming a closed loop around the cylindrical drum and a space between the housing and the cutting drum, the space increasing along the length and width of the cutting drum.

7. A machine for reducing material comprising: a cutting drum having an end region and surrounded radially by a closed-loop housing; a drive system connected to the cutting drum; a side discharge assembly disposed at the end region of the cutting drum; the housing surrounding the cutting drum and establishing a volume between itself and the cutting drum for reduced material to be carried, the volume increasing along the length of the cutting drum until the volume opens into the side discharge assembly disposed at the end region of the cutting drum wherein the housing forms a closed loop around the cylindrical drum in a conical shape that opens at one end into the side discharge assembly.

8. The machine for reducing material of claim 7 further comprising at least one paddle connected to the cylindrical cutting drum and disposed within the side discharge assembly.

9. The machine for reducing material of claim 7, wherein the cylindrical cutting drum has a face that is angled between 20 and 40 degrees relative to the in-feed.

10. The machine for reducing material of claim 7, wherein the cylindrical cutting drum has at least one channel, the at least one channel at least partially blocked at each end of the channel.

11. The machine for reducing material of claim 10, further including a cutting implement disposed adjacent to the channel.

12. The machine for reducing material of claim 7 further including a space between the housing and the cutting drum which increases along the length and width of the cutting drum.

13. A drum shredder comprising: an in-feed, a cylindrical cutting drum having an essentially uniform cross-section in material flow communication with the in-feed, a belly-pan at least partially wrapping the cylindrical cutting drum, a space between the belly-pan and the cutting drum which increases along the length and width of the cutting drum, and a side discharge assembly disposed adjacent and to the side of the cutting drum and in material flow communication with the cylindrical cutting drum and the belly-pan.

14. The drum shredder of claim 13 wherein the cutting drum has a plurality of paddles, the paddles residing in the side discharge assembly, the paddle(s) positioned to receive material from the cutting drum and directly move and throw material that comes into contact with the paddles through the discharge port while generating air currents through the side discharge assembly.

15. The drum shredder of claim 13 further including a housing forming a closed loop around the cylindrical cutting drum.

16. The drum shredder of claim 15 wherein the housing increases in volume along the length of the cutting drum towards the side discharge assembly.

17. The drum shredder of claim 13 further including blades mounted on the radial face of the cylindrical drum.

18. The drum shredder of claim 13 wherein the cutting drum is angled 20 degrees or more in relation to the in-feed.

* * * * *